United States Patent [19]

Tamura et al.

[11] Patent Number: 4,770,501
[45] Date of Patent: Sep. 13, 1988

[54] OPTICAL MODULATION DEVICE AND METHOD OF DRIVING THE SAME

[75] Inventors: Yasuyuki Tamura, Yokohama; Shinjiro Okada, Kawasaki, both of Japan

[73] Assignee: Canon Kabushiki Kaisha, Tokyo, Japan

[21] Appl. No.: 833,539

[22] Filed: Feb. 27, 1986

[30] Foreign Application Priority Data

Mar. 7, 1985 [JP] Japan .................................. 60-43791

[51] Int. Cl.$^4$ .............................................. G02F 1/13
[52] U.S. Cl. ................................. 350/350 S; 350/332; 350/333
[58] Field of Search ............ 350/331, 332, 333, 350 S, 350/352; 340/765, 784, 718, 719, 783

[56] References Cited

U.S. PATENT DOCUMENTS

| | | | |
|---|---|---|---|
| 4,204,217 | 5/1980 | Goodman | 350/334 |
| 4,367,924 | 1/1983 | Clark et al. | 350/352 |
| 4,448,491 | 5/1984 | Okubo | 350/333 |
| 4,508,429 | 4/1985 | Nagae et al. | 350/350 S |
| 4,556,727 | 12/1985 | Walba | 350/350 S |
| 4,613,209 | 9/1986 | Goodby et al. | 350/350 S |
| 4,655,561 | 4/1987 | Kanbe et al. | 350/333 |

FOREIGN PATENT DOCUMENTS

| | | | |
|---|---|---|---|
| 0262137 | 12/1985 | Japan | 350/332 |
| 0262136 | 12/1985 | Japan | 350/332 |
| 0007825 | 1/1986 | Japan | 350/332 |
| 0009625 | 1/1986 | Japan | 350/332 |
| 0004026 | 1/1986 | Japan | 350/332 |
| 0007829 | 1/1986 | Japan | 350/332 |
| 2136185 | 9/1984 | United Kingdom | 350/350 S |

Primary Examiner—Stanley D. Miller
Assistant Examiner—Huy Mai
Attorney, Agent, or Firm—Fitzpatrick, Cella, Harper & Scinto

[57] ABSTRACT

An optical modulation device comprising a plurality of first signal lines ($S_1$-$S_n$-$S_N$); a plurality of second signal lines ($G_1$-$G_l$-$G_L$) intersecting with the first signal lines, a plurality of field effect transistors disposed at each intersection of the first and second signal lines, each field effect transistor comprising a gate connected to a second signal line, a first terminal other than the gate connected to a first signal line, and a second terminal other than the gate, a picture element electrode connected to the second terminal, a counter electrode disposed opposite to the picture element electrode and connected to a third signal line, and an optical modulation material showing a first stable state and a second stable state interposed between the picture element electrode and the counter electrode.

9 Claims, 9 Drawing Sheets

OPTICAL MODULATION DEVICE AND METHOD OF DRIVING THE SAME

FIELD OF THE INVENTION AND RELATED ART

This invention relates to a display panel using an optical modulation device and a method of driving the same and, more particularly, to a ferroelectric liquid crystal device with an active matrix structure and a method of driving the same.

As a liquid crystal display system, there is a matrix display system. This system has a large number of picture elements for the display of image or information. The picture elements are constituted by a scanning electrode group and a signal electrode group arranged in the form of a matrix, and a liquid crystal compound provided between the two electrode groups. In this system, if the display image density or display screen size is increased, enormous numbers of scanning electrodes and display electrodes are required. As a result, the response speed of the liquid crystal is reduced. In addition, so-called crosstalk occurs due to distribution of voltage to picture elements other than "ON" picture elements. To overcome these two drawbacks, there have been proposed various methods, e.g., a voltage averaging method, a dual frequency driving method, a divided matrix method and a multiplex matrix method. It is difficult, however, for any of these methods to cope with the increase of scanning lines accompanying the increase of display elements for complying with the increase of the display screen or image density. Recently, an active matrix display system has been contemplated and is in practical use. In this system, the liquid crystal is driven directly by a plurality of switching elements such as field-effect transistors, which are provided corresponding to respective picture elements and arranged in the form of a matrix.

This active matrix system can solve the problem of crosstalk. However, where conventional liquid crystal (nematic) devices are used, the display speed is limited. In addition, the display screen size has an upper limit imposed by the repetition frequency. The deficiency in case of the nematic liquid crystal can be improved by using a ferroelectric liquid crystal for the liquid crystal device. In this case, however, the simplification of the circuit structure accompanying the increase in display image density is insufficient, and a further improvement is desired in this regard.

SUMMARY OF THE INVENTION

The present invention has been intended to solve the problems discussed above in the prior art, and its object is to greatly reduce signal lines and simplify the circuit through improvement in circuit structure of display electrodes with an active matrix.

According to the present invention, there is provided an optical modulation device comprising: a plurality of first signal lines ($S_1$-$S_n$-$S_N$); a plurality of second signal lines ($G_1$-$G_l$-$G_L$) intersecting with the first signal lines; a plurality of field effect transistors disposed at each intersection of the first and second signal lines, each field effect transistor comprising a gate connected to a second signal line, a first terminal other than the gate connected to a first signal line, and a second terminal other than the gate; a picture element electrode connected to the second terminal; a counter electrode disposed opposite to the picture element electrode and connected to a third signal line; and an optical modulation material showing a first stable state and a second stable state interposed between the picture element electrode and the counter electrode.

These and other objects, features and advantages of the present invention will become more apparent upon a consideration of the following description of the preferred embodiments of the present invention taken in conjunction with the accompanying drawings.

BRIEF DESCRIPTION OF THE DRAWINGS

FIG. 12 is a partial sectional view taken along the line B—B in FIG. 10.

DETAILED DESCRIPTION OF PREFERRED EMBODIMENTS

First of all, the optical modulation material is explained. The optical modulation material to be used in the optical modulation device according to the present invention may be a material showing a first stable state and a second stable state depending on an electric field applied thereto, preferably a liquid crystal showing either one of the first and second optically stable states.

The optical modulation material having such a property as described above that can be used in the present invention, is most suitably a chiral smectic liquid crystal. Among the chiral smectic liquid crystals, those showing chiral smectic C phase (SmC*) or H phase (SmH*) are especially preferred. These ferroelectric liquid crystals are described in, e.g., "LE JOURNAL DE PHYSIQUE LETTERS" 36 (L-69), 1975 "Ferroelectric Liquid Crystals"; "Applied Physics Letters" 36 (11) 1980, "Submicro Second Bistable Electrooptic Switching in Liquid Crystals", "Kotai Butsuri (Solid State Physics)" 16 (141), 1981 "Liquid Crystal", etc. Ferroelectric liquid crystals disclosed in these publications may be used in the present invention.

More particularly, examples of ferroelectric liquid crystal compound usable in the method according to the present invention include decyloxybenzylidenep'-amino-2-methylbutyl cinnamate (DOBAMBC), hexyloxybenzylidene-p'-amino-2-chloropropyl cinnamate (HOBACPC), 4-o-(2-methyl)-butylresorcylidene-4'-octylaniline (MBRA8), etc.

When a device is constituted by using these materials, the device may be supported with a block of copper, etc., in which a heater is embedded in order to realize a temperature condition where the liquid crystal compounds assume a chiral smectic phase.

Figure 2:
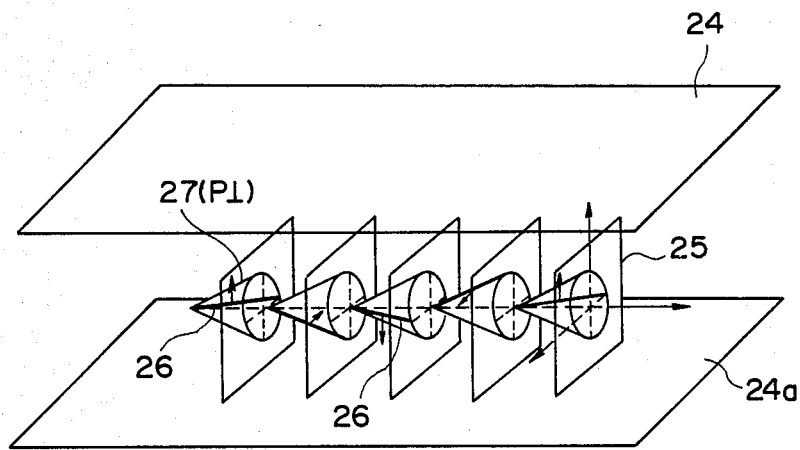
FIGS. 2 and 3 are schematic perspective views illustrating the basic operation principle of a ferroelectric liquid crystal device used in accordance with the present invention.
Figure 3:
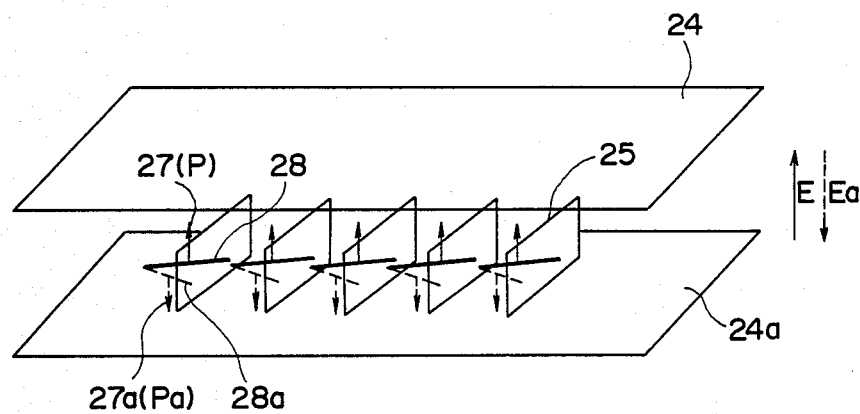

Referring to FIG. 2, there is schematically shown an example of a ferroelectric liquid crystal cell for explanation of the operation thereof. Reference numerals 24 and 24a denote base plates (glass plates) on which a transparent electrode of, e.g., $In_2O_3$, $SnO_2$, ITO (Indium-Tin Oxide), etc., is disposed, respectively. A liquid crystal of an SmC*- or SmH*-phase in which liquid crystal molecular layers 25 are oriented perpendicular to surfaces of the glass plates is hermetically disposed therebetween. A full line 26 shows liquid crystal molecules. Each liquid crystal molecule 26 has a dipole moment ($P_\perp$) 27 in a direction perpendicular to the axis thereof. When a voltage higher than a certain threshold level is applied between electrodes formed on the base plates 24 and 24a, a helical structure of the liquid crystal molecule 26 is loosened or unwound to change the alignment direction of respective liquid crystal molecules 26 so that the dipole moment ($P_\perp$) 27 are all directed in the direction of the electric field. The liquid crystal molecules 26 have an elongated shape and show refractive anisotropy between the long axis and the short axis thereof. Accordingly, it is easily understood that when, for instance, polarizers arranged in a cross nicol relationship, i.e., with their polarizing directions crossing each other, are disposed on the upper and the lower surfaces of the glass plates, the liquid crystal cell thus arranged functions as a liquid crystal optical modulation device, of which optical characteristics vary depending upon the polarity of an applied voltage. Further, when the thickness of the liquid crystal cell is sufficiently thin (e.g., $1\mu$), the helical structure of the liquid crystal molecules is loosened even in the absence of an electric field whereby the dipole moment assumes either of the two states, i.e., P in an upper direction 27 or Pa in a lower direction 27a as shown in FIG. 3. When electric field E or Ea higher than a certain threshold level and different from each other in polarity as shown in FIG. 3 is applied to a cell having the above-mentioned characteristics, the dipole moment is directed either in the upper direction 27 or in the lower direction 27a depending on the vector of the electric field E or Ea. In correspondence with this, the liquid crystal molecules are oriented in either of a first stable state 28 and a second stable state 28a.

When the above-mentioned ferroelectric liquid crystal is used as an optical modulation element, it is possible to obtain two advantages. The first is that the response speed is quite fast. The second is that the orientation of the liquid crystal shows bistability. The second advantage will be further explained, e.g., with reference to FIG. 3. When the electric field E is applied to the liquid crystal molecules, they are oriented in the first stable state 28. This state is kept stable even if the electric field is removed. On the other hand, when the electric field Ea of which direction is opposite to that of the electric field E is applied thereto, the liquid crystal molecules are oriented to the second stable state 28a, whereby the directions of molecules are changed. This state is also kept stable even if the electric field is removed. Further, as long as the magnitude of the electric field E or Ea being applied is not above a certain threshold value, the liquid crystal molecules are placed in the respective orientation states. In order to effectively realize high response speed and bistability, it is preferable that the thickness of the cell is as thin as possible and generally 0.5 to $20\mu$, particularly 1 to $5\mu$. A liquid crystal-electrooptical device having a matrix electrode structure in which the ferroelectric liquid crystal of this kind is used is proposed, e.g., in the specification of U.S. Pat. No. 4,367,924 by Clark and Lagerwall.

Figure 1:
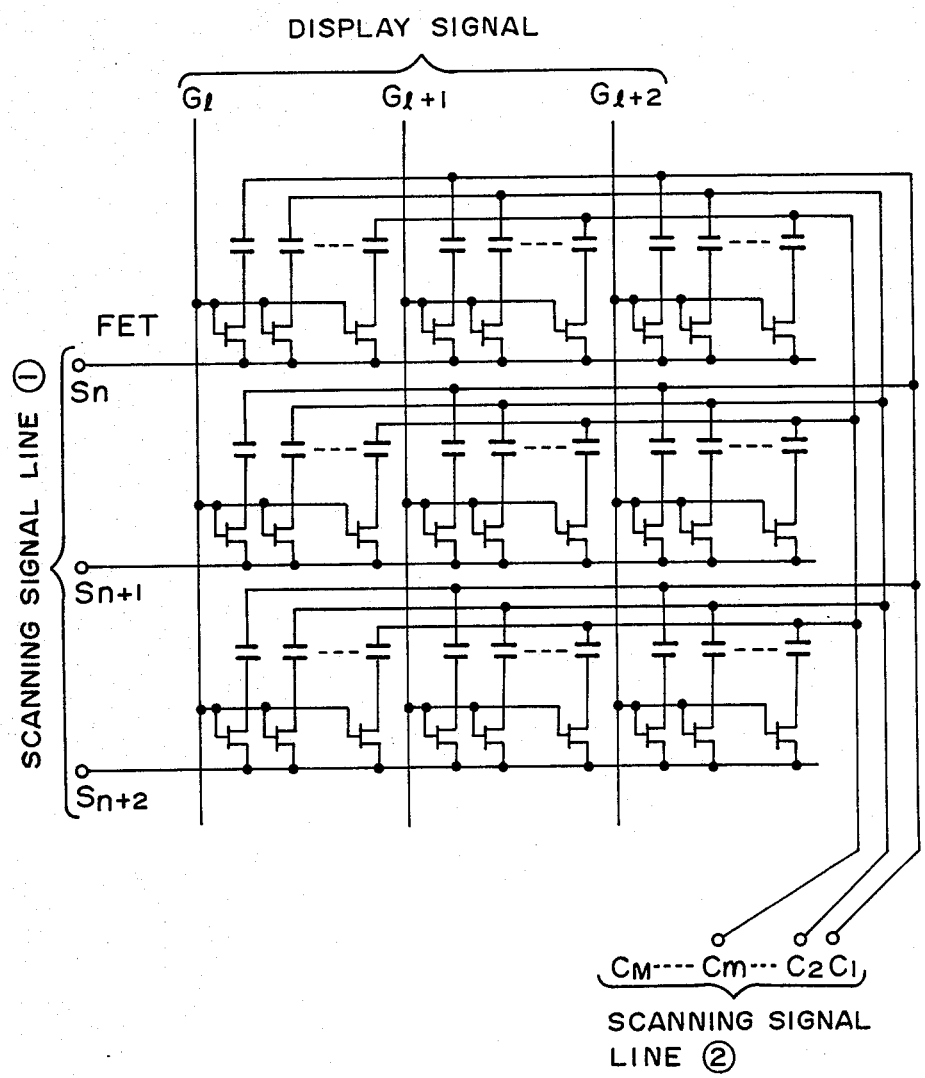
FIG. 1 is a circuit diagram illustrating a basic concept of the invention.

FIG. 1 is a circuit diagram illustrating a basic concept of the invention. As is shown in the figure, a plurality of FETs (i.e., field-effect transistors) are disposed at each intersection of scanning signal lines (1) and display signal lines arranged to form a matrix. Gates of the plurality of FETs are commonly connected to a display signal line, and first terminals acting as the sources or drains of the plurality of FETs are commonly connected to a scanning signal line (1). Each of the second terminals acting as the drains or sources of the plurality of FETs is connected to a picture element electrode. There are further disposed a corresponding number of counter electrodes respectively opposite to the picture element electrodes. The display panel is driven in the following manner. A scanning signal is applied to scanning signal lines (1) leading to the first terminals acting as the sources or drains of the FETs, and also a scanning signal is applied to scanning lines (2) disposed in parallel with the scanning lines (1) and leading to the plurality of counter electrodes. On the other hand, a display signal is applied to display signal lines disposed perpendicular to the scanning signals (1) and the scanning signals (2).

Where there are n picture elements for display, generally $\sqrt{n}\times 2$ or more lead lines are necessary, whereas approximately $\sqrt[3]{n}\times 3$ lead lines are necessary according to the invention. Where there is no natural number corresponding to the cubic root of n, it is necessary to slightly increase the number of lead lines than the above estimation.

As is apparent from the circuit structure shown in FIG. 1, according to the invention, image display is accomplished by using two of three signal line groups as scanning signal line groups for selection of writing lines while feeding a display signal to the remaining signal line group. More specifically, a signal voltage is applied to the gate of an FET so that the FET is in a gate "ON" state, while an electric field is set up simultaneously between the source and drain, i.e., the terminals other than the gate, of the FET and the polarity of the field is controlled to switch the display state between two states, i.e., a first orientation state and a second orientation state of the liquid crystal. According to the invention, therefore, a ferroelectric liquid crystal is preferably used, which can selectively assume either one of two, i.e., first and second, optically stable states depending on the polarity of the electric field. Thus, a ferroelectric liquid crystal having bistability with respect to the electric field, is preferably used. With an FET serving as an active element, selection as to which one of the two terminals other than the gate terminal serves as a source and the other as a drain, depends on the polarity of the applied voltage regardless of whether the FET is of p- or n-type. In case of an n-type FET, the terminal at a lower potential is the source, while with a p-type FET, the terminal at a higher potential serves as the source. The voltage levels at the individual signal electrodes may be set to desired values and are not restricted to the values in examples given below so long as certain potential differences are retained between the signals.

A specific example of the image display using a liquid crystal display device according to the invention will now be described with reference to FIGS. 1 and 4 to 7.

Figure 5:
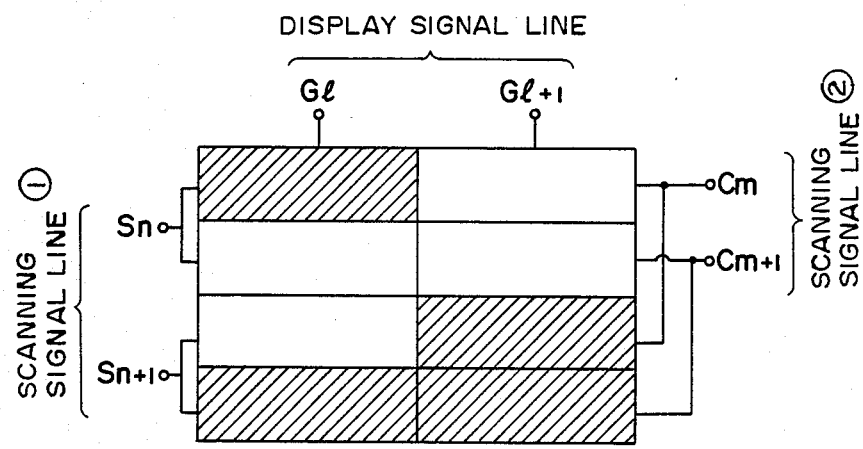
FIG. 5 is a view for illustrating a display pattern of picture elements.

In the circuit of FIG. 1, the driving or active elements are n-type FETs, preferably TFTs (thin film transistors), and the liquid crystal is a ferroelectric liquid crystal. Various voltages for writing a predetermined display pattern as shown in FIG. 5 are set to desired values which can satisfy the following conditions.

(1) A case where "bright" is written at a position with n=a among scanning signal lines ①, m=b among scanning signal lines ② and l=c among display signal lines:

| | | |
|---|---|---|
| $V_{Cm} + V_{LC} < V_{Sn}$ | (n = a, m = b) | } "bright" is written on selected ①, ② lines |
| $V_{Gl} - V_P > V_{Cm} + V_{LC}$ | (m = b, l = c) | |
| $V_{Gl} - V_P < V_{Cm} + V_{LC}$ | (m = b, l ≠ c) | } non-writing points on selected ①, ② lines |
| $V_{Gl} - V_P < V_{Cm} + V_{LC}$ or | (m ≠ b, l = all) | } ① selected |
| $V_{Cm} + V_{LC} > V_{Sn}$ | (n = a, m ≠ b) | ② non-selected |
| $V_{Cm} - V_{LC} < V_{Sn}$ and | (m = b, n ≠ a) | } ① non-selected |
| $V_{Cm} + V_{LC} > V_{Sn}$ | (m = b, n ≠ a) | ② selected |
| $V_{Cm} - V_{LC} < V_{Sn}$ and | (m ≠ b, n ≠ a) | |
| $V_{Cm} + V_{LC} > V_{Sn}$ or | (m ≠ b, n ≠ a) | } ① non-selected ② non-selected |
| $V_{Gl} - V_P < V_{Sn}$ | (n ≠ a, l = all) | |
| $V_{Gl} - V_P < V_{Cm} + V_{LC}$ | (m ≠ b, l = all) | |

(2) A case where "dark" is written at a position with n=a among scanning signal lines ① m=b among scanning signal lines ② and l≠c among display signal lines:

| | | |
|---|---|---|
| $V_{Cm} - V_{LC} > V_{Sn}$ | (n = a, m = b) | } "dark" is written on selected ①, ② lines |
| $V_{Gl} - V_P > V_{Sn}$ | (n = a, l ≠ c) | |
| $V_{Gl} - V_P < V_{Sn}$ | (n = a, l = c) | } non-selected points on selected ①, ② lines |
| $V_{Cm} - V_{LC} < V_{Sn}$ and | (n = a, m ≠ b) | } ① selected |
| $V_{Cm} + V_{LC} > V_{Sn}$ | (n = a, m ≠ b) | ② non-selected |
| $V_{Gl} - V_P < V_{Sn}$ or | (n ≠ a, l = all) | } ① non-selected |
| $V_{Cm} - V_{LC} < V_{Sn}$ | (n ≠ a, m = b) | ② selected |
| $V_{Cm} - V_{LC} < V_{Sn}$ and | (m ≠ b, n ≠ a) | |
| $V_{Cm} + V_{LC} > V_{Sn}$ or | (m ≠ b, n ≠ a) | } ① non-selected ② non-selected |
| $V_{Gl} - V_P < V_{Sn}$ | (n ≠ a, l = all) | |
| $V_{Gl} - V_P < V_{Cm} + V_{LC}$ | (m ≠ b, l = all) | |

In the above, respective symbols represent the following:

$V_{LC}$: absolute value of threshold voltage of a ferroelectric liquid crystal,
$V_P$: Gate threshold voltage of the FETs constituting the active matrix,
$V_{Sn}$: Voltage on scanning signal line ①,
$V_{Cm}$: Voltage on scanning signal line ②, and
$V_{Gl}$: Voltage on display signal line.

Figure 4:
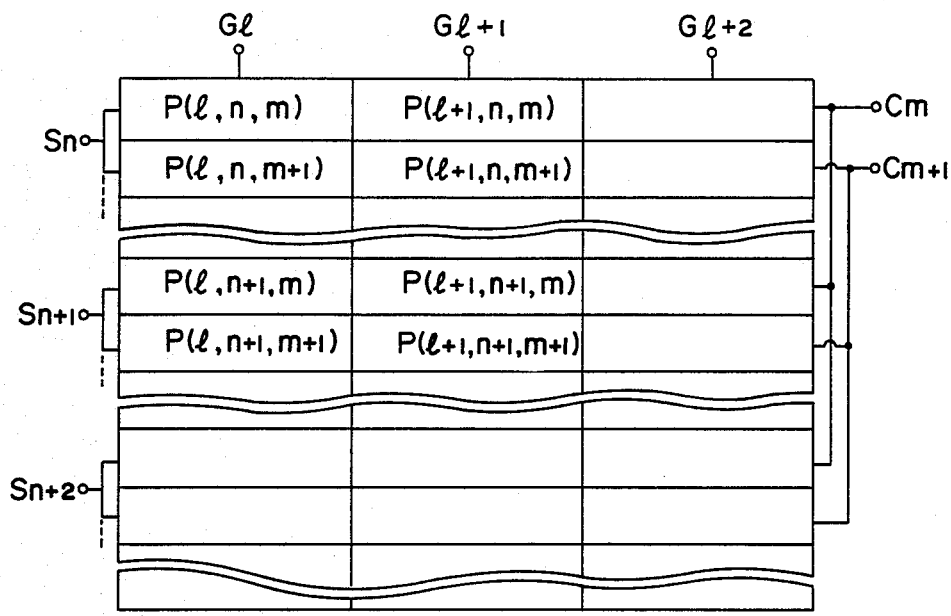
FIG. 4 is a view showing coordinates of picture elements.
Figure 6A:
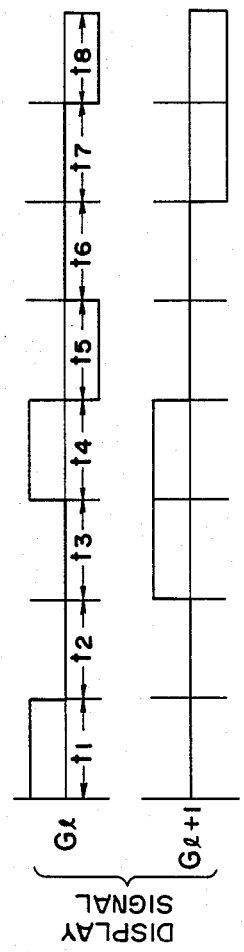
FIGS. 6A to 6C show waveform diagrams of electric signals applied to scanning lines and signal lines.
Figure 6B:
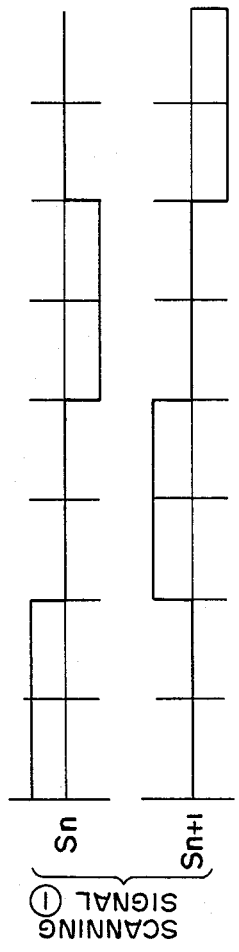
Figure 6C:
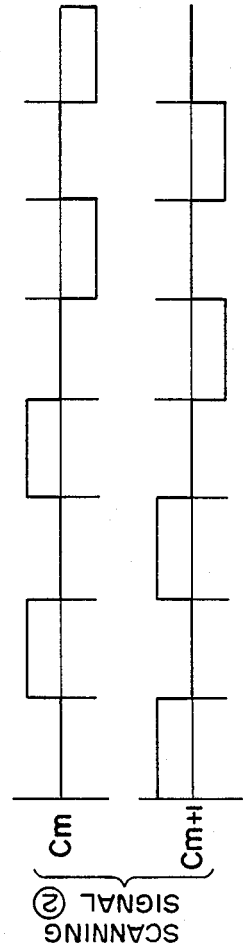
Figure 7:
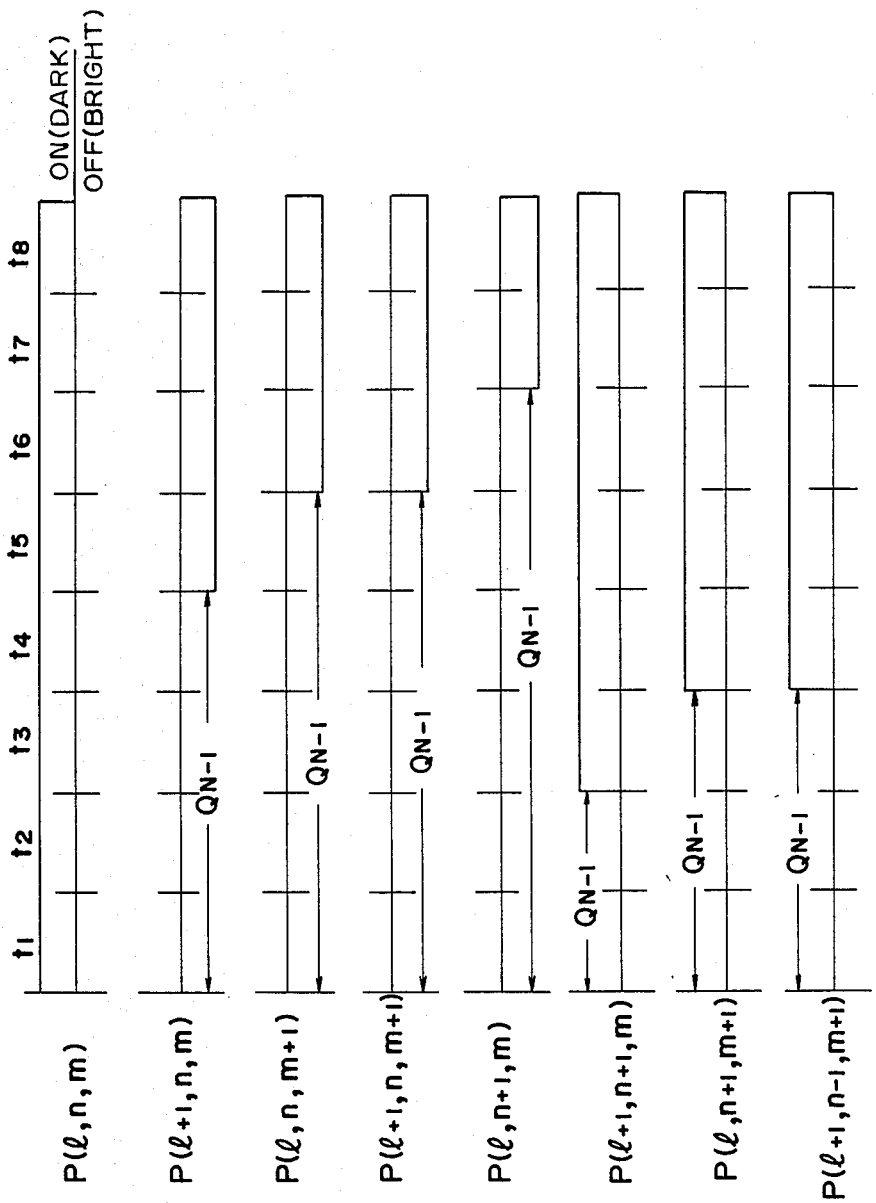
FIG. 7 is a view for explaining a writing operation.

FIG. 6 shows the waveforms of the above various signal voltages at phases $t_1$ to $t_8$. In the diagrams of FIG. 6, the ordinate represents the voltage, and the abscissa represents the time. FIG. 7 illustrates a writing operation, when the electric signals as shown in FIG. 6 are given. In the diagrams of FIG. 7, the ordinate represents the display state, with the upper side showing "on" (dark) state and the lower side showing "off" (bright) state, and the abscissa represents the time. The diagrams show that the picture elements are "dark" or "bright" at various time phases. In the Figure, $Q_{N-1}$ indicates that the state of signal in the preceding scanning cycle is retained. The positions or coordinates of the individual picture elements indicated in FIG. 7 are shown in FIG. 4. The desired display pattern shown in FIG. 5 is completed through the operations shown above at the phases $t_1$ to $t_8$.

While an embodiment of $V_p = 0$ is explained with reference to FIG. 6, $V_G$ (i.e., gate voltage) may be shifted by $V_p$ in a case where $V_p \neq 0$. Where "DO-BAMBC" is used as the ferroelectric liquid crystal in the above example, $V_{LC} = 1$ to 20 V, the operating temperature is 75° to 85° C., and the time necessary for writing one picture element is approximately 50 μsec.

The liquid crystal panel according to the present invention comprises an active matrix using FETs so that a problem of a crosstalk as experienced in a conventional passive matrix display system can be obviated. For example, a plurality of FETs commonly connected to one matrix intersecting point are simultaneously turned ON or OFF. Nevertheless, if the potential of the counter electrodes (e.g., scanning signal lines ②) at non-selected picture elements are brought to the same level as that of the scanning signal lines ① when the respective FETs are turned ON, no voltage is applied to the non-selected picture elements. In other words, when the FETs are placed in the ON state, no voltage is applied to the liquid crystal layer at the non-selected picture elements, since there is no potential difference between the scanning lines ① and ②. On the other hand, when the FETs are in the OFF state, as the FETs are independently formed for respective picture elements, no voltage is applied to the liquid crystal layer at the respective picture elements regardless of voltages applied to the scanning signal lines (2). Thus, a prescribed voltage is applied to only selected picture elements so that crosstalk does not occur.

In the above embodiment, one counter electrode is disposed to face one picture element electrode. However, a plurality of counter electrodes can also be disposed to face one picture element electrode. According to such an arrangement, the number of picture elements on a panel may be larger than the number of FETs on the panel. In this case, among a plurality of picture elements formed corresponding to one picture element electrode, crosstalk can occur. The possibility of the crosstalk can however be sufficiently minimized, if the number of picture elements corresponding to one picture element electrode is small.

Figure 8:
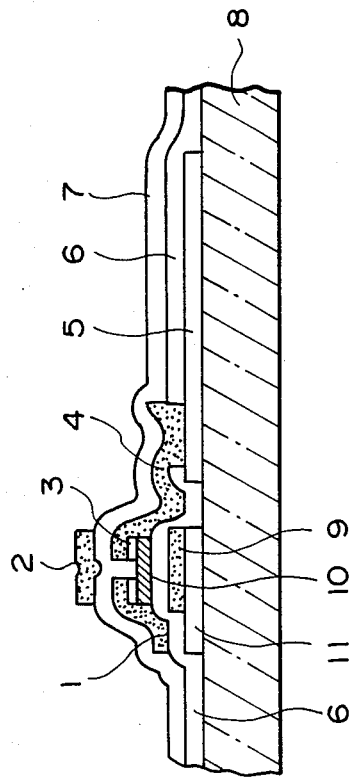
FIG. 8 is a sectional view showing a laminated structure of a TFT (thin film transistor) to be used in the present invention.
Figure 9:
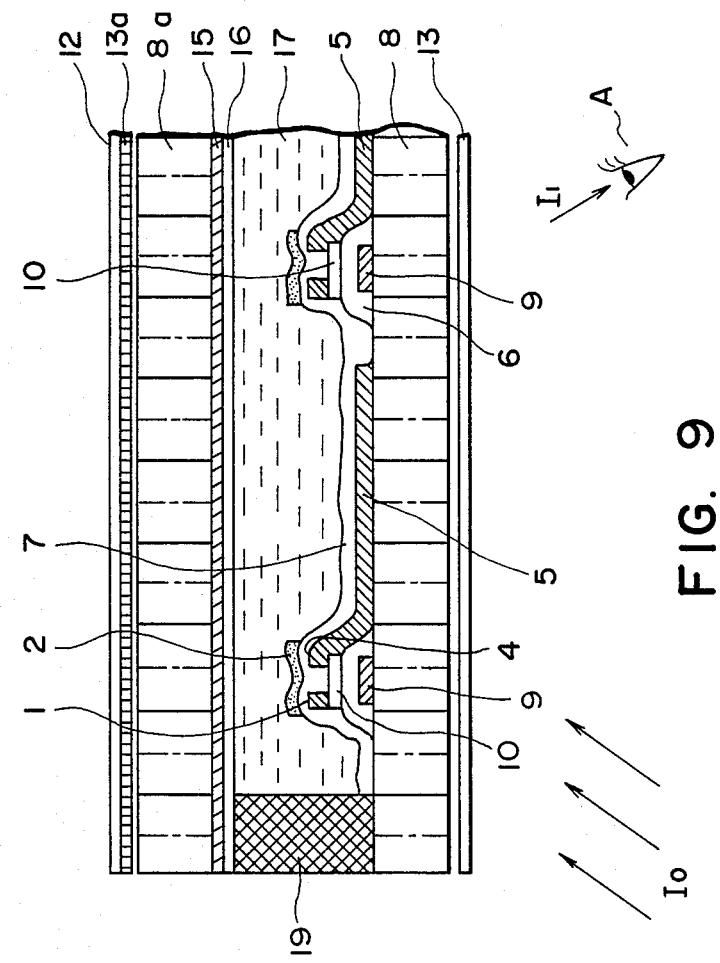
FIG. 9 is a partial sectional view of a ferroelectric liquid crystal cell using a TFT.
Figure 10:
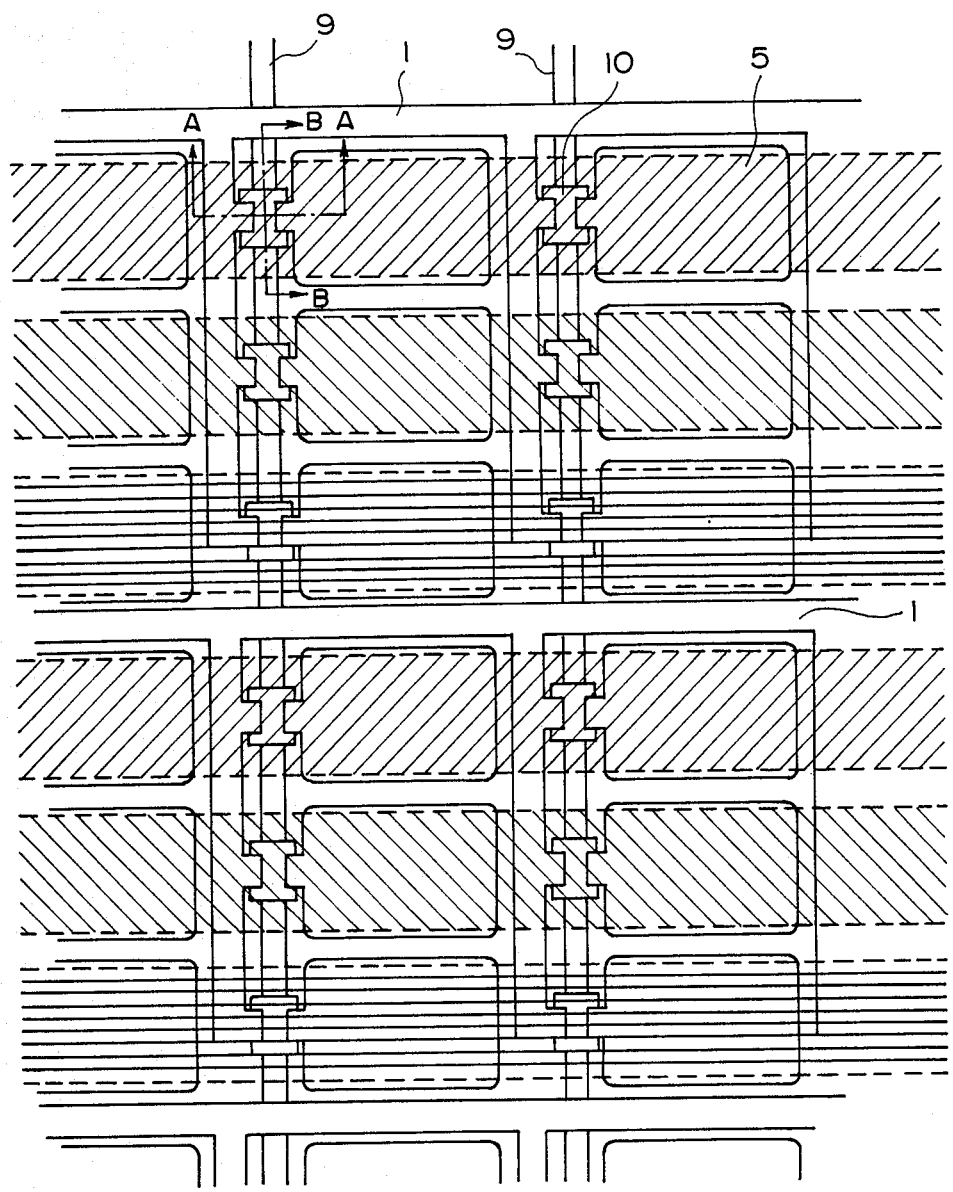
FIG. 10 is a plan view showing a TFT substrate.
Figure 11:
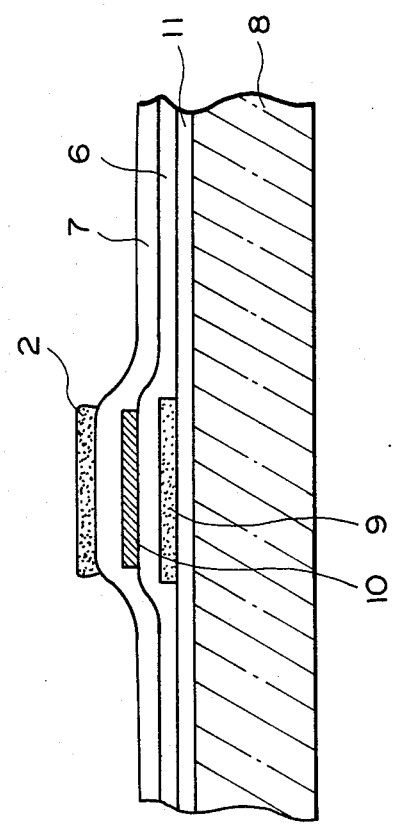
FIG. 11 is a partial sectional view taken along the line A—A in FIG. 10.

FIG. 8 is a partial sectional view of a TFT substrate to be used in the present invention, FIG. 9 is a partial sectional view showing a ferroelectric liquid crystal cell incorporating the TFT substrate shown in FIG. 8 with a slightly modified form, FIG. 10 is a plan view of the TFT substrate, FIG. 8 corresponding to a sectional view taken along the A—A line in FIG. 10 and FIG. 11 is a sectional view taken along the line B—B in FIG. 10. The structure of the liquid crystal device and the TFT substrate used therein will be understood by an explanation mainly directed to FIG. 9 as follows.

FIG. 9 shows an embodiment of the liquid crystal device according to the present invention. As is shown, on a base plate 8, made of glass, plastics, etc., are formed TFTs, each of which consists of a gate electrode 9 connected to a signal line 6, a semiconductor film 10 (of amorphous silicon doped with hydrogen atoms) formed over the gate electrode via an insulating film 6 (e.g., a silicon nitride film doped with hydrogen atoms) and two terminals 1 and 4 disposed contiguous to the semiconductor film 10 through an optional n+ layer 3 (not shown in FIG. 9). Picture element electrodes 5 (of ITO) are also formed on the base plate 8, each being connected to the terminal 4 of each TFT. A transparent electrode 11 (not shown in FIG. 9) may optionally be interposed below the gate 9. The parts described above are covered by an insulating layer 7 of such material as polyimide, polyamide, polyvinyl alcohol, polyparaxylylene, SiO and SiO$_2$. Light shielding films 2 of such material as aluminum and chromium are formed on the insulating layer 7. On the opposed surface of the other base plate 8a are formed counter electrodes 15 (of ITO). An insulating film 16 is also formed, which also serves as an orientation controlling film. Ferroelectric liquid crystal 17 as noted above is provided between the base plates 8 and 8a. A sealing material 19 is provided along the peripheries of the base plates 8 and 8a to seal or enclose the ferroelectric liquid crystal 17.

Polarizers 13 and 13a are provided in the arrangement of cross nicols on opposite sides of the liquid crystal device having the above cell structure. Further, a reflector 12 consisting of a light-scattering aluminum sheet or plate is provided behind the polarizer 13a so that an observer A can recognize the display state from reflected light $I_1$ resulting from incident light $I_0$.

In the above Figures, the source and drain electrodes of FET are called as such when and only when current flows from the drain to the source. It is possible that the source serves as the drain depending on the function of FET.

As has been described in the foregoing, according to the invention, signal lines can be extremely reduced compared to the prior art circuit structure. Thus, there is obtained a remarkable improvement in respect of simplification of circuit structure.

What is claimed is:

1. A driving method for an optical modulation device, comprising:
   providing an optical modulation comprising a plurality of first signal lines ($S_1$-$S_n$-$S_N$); a plurality of second signal lines ($G_1$-$G_l$-$G_L$) intersecting with the first signal lines; a plurality of field effect transistors disposed at each intersection of the first and second signal lines, each field effect transistor comprising a gate connected to a second signal line, a first terminal other than the gate connected to a first signal line, and a second terminal other than the gate; a picture element electrode connected to the second terminal; a counter electrode disposed opposite to the picture element electrode and connected to a third signal line; and an optical modulation material showing a first stable state and a second stable state interposed between the picture element electrode and the counter electrode,
   applying scanning signals to the first signal lines connected to the first terminals of the field effect transistors and the third signal lines connected to the counter electrodes, and
   applying information signals to the second signal lines.

2. A driving method according to claim 1, wherein said first signal lines connected to the sources or drains of the field effect transistors, and said second signal lines connected to the gates of the field effect transistors.

3. A driving method according to claim 1, which comprises: a first phase of applying a signal for orienting the optical modulating material to the first stable state to picture elements connected to selected first signal lines, selected second signal lines and selected third signal lines, and a second phase of applying a signal for orienting the optical modulation material to the second stable states to picture elements connected to selected first signal lines, selected third signal lines and non-selected second signal lines.

4. A driving method according to claim 3, wherein said first and second phases of operations are conducted simultaneously.

5. A driving method according to claim 1, wherein a plurality of the counter electrodes are disposed opposite to one picture element electrode.

6. A driving method according to claim 1, wherein said optical modulation material is a ferroelectric liquid crystal.

7. A driving method according to claim 1, wherein said optical modulation material is a chiral smectic liquid crystal.

8. A driving method according to claim 7, wherein said chiral smectic liquid crystal is in a non-helical structure.

9. A driving method according to claim 1, wherein said field effect transistor is a thin film transistor.

* * * * *

UNITED STATES PATENT AND TRADEMARK OFFICE
CERTIFICATE OF CORRECTION

PATENT NO. : 4,770,501
DATED : September 13, 1988
INVENTOR(S) : Yasuyuki Tamura, et al.

It is certified that error appears in the above-identified patent and that said Letters Patent is hereby corrected as shown below:

COLUMN 2

Line 61, change "decyloxybenzylidenep'-" to --decyloxybenzylidene-p' --.

COLUMN 4

Line 30, change "X3" to --nX3--.

COLUMN 5

Line 57, change "line 11 (2)" to --line (2)--.

Signed and Sealed this

Fourth Day of July, 1989

Attest:

DONALD J. QUIGG

Attesting Officer

Commissioner of Patents and Trademarks